(12) United States Patent
Silva et al.

(10) Patent No.: US 11,771,199 B2
(45) Date of Patent: *Oct. 3, 2023

(54) MAKEUP TOOL AND APPLICATOR

(71) Applicant: Rea.deeming Beauty, Inc., Bethlehem, PA (US)

(72) Inventors: Rea Ann Silva, Bethlehem, PA (US); Brittany Blass, Venice, CA (US); Kayla Lastella, New York, NY (US)

(73) Assignee: REA.DEEMING BEAUTY, INC., Bethlehem, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,248

(22) Filed: Jul. 13, 2022

(65) Prior Publication Data

US 2022/0346523 A1 Nov. 3, 2022

Related U.S. Application Data

(63) Continuation of application No. 16/536,295, filed on Aug. 8, 2019, now Pat. No. 11,412,830.

(Continued)

(51) Int. Cl.
*B32B 27/12* (2006.01)
*A45D 33/34* (2006.01)
(Continued)

(52) U.S. Cl.
CPC .............. *A45D 33/34* (2013.01); *A45D 34/04* (2013.01); *A45D 40/26* (2013.01); *B32B 7/09* (2019.01);
(Continued)

(58) Field of Classification Search
CPC ........ G02C 13/00; G02C 7/024; G02C 7/028; G02C 7/06; G02C 7/061; G02C 7/068; G02C 7/066; A45D 2200/1018; A45D 33/34; A45D 34/04; A45D 40/26; B32B 2250/04; B32B 2262/0276; B32B 2262/062; B32B 2266/0278; B32B 2266/12; B32B 2307/31; B32B 2307/51; B32B 27/065; B32B 27/08; B32B 27/12; B32B 27/40; B32B 3/02; B32B 3/08; B32B 3/26; B32B 5/024; B32B 5/026;
(Continued)

(56) References Cited

U.S. PATENT DOCUMENTS 1,374,903 A 4/1921 Florence
1,431,336 A 10/1922 William
(Continued)

FOREIGN PATENT DOCUMENTS

CN 206453438 U 9/2017
CN 107568879 A 1/2018
(Continued)

OTHER PUBLICATIONS

International Search Report and Written Opinion for PCT/US19/45815, dated Dec. 18, 2019.

*Primary Examiner* — Lawrence D Ferguson
(74) *Attorney, Agent, or Firm* — Concept IP LLP; Pejman Yedidsion

(57) ABSTRACT

Systems, devices, and methods including: a first layer; a second layer; a pocket formed between the first layer and the second layer to receive a fingertip of a user; and an elastic layer disposed over a portion of the first layer or the second layer to secure the fingertip of the user.

19 Claims, 11 Drawing Sheets

Related U.S. Application Data

(60) Provisional application No. 62/716,171, filed on Aug. 8, 2018.

(51) Int. Cl.
| | |
|---|---|
| *A45D 34/04* | (2006.01) |
| *A45D 40/26* | (2006.01) |
| *B32B 27/40* | (2006.01) |
| *B32B 7/09* | (2019.01) |
| *B32B 7/12* | (2006.01) |
| *B32B 27/06* | (2006.01) |

(52) U.S. Cl.
CPC .............. *B32B 7/12* (2013.01); *B32B 27/065* (2013.01); *B32B 27/12* (2013.01); *B32B 27/40* (2013.01); *A45D 2200/1018* (2013.01); *B32B 2266/0278* (2013.01)

(58) Field of Classification Search
CPC .. B32B 5/06; B32B 5/18; B32B 5/245; B32B 7/022; B32B 7/09; B32B 7/12
See application file for complete search history.

(56) References Cited

U.S. PATENT DOCUMENTS

| | | |
|---|---|---|
| 1,629,772 A | 5/1927 | Saverio |
| 1,658,795 A | 2/1928 | Joseph |
| 1,852,566 A | 4/1932 | Harrison |
| 1,864,886 A | 6/1932 | Roger |
| 1,975,260 A | 10/1934 | Irving |
| 2,329,267 A | 9/1943 | Harllee |
| 2,492,278 A | 12/1949 | Foster |
| 2,904,814 A | 9/1959 | Scholl |
| 3,472,242 A | 10/1969 | Demner |
| D332,841 S | 1/1993 | Levison |
| D412,596 S | 8/1999 | Tappin et al. |
| D418,945 S | 1/2000 | Chen |
| 8,247,466 B2 | 8/2012 | Brown |
| D773,731 S | 12/2016 | Harris |
| 2006/0207046 A1 | 9/2006 | Manlove et al. |
| 2017/0143102 A1 | 5/2017 | Silva |
| 2017/0208919 A1 | 7/2017 | Silva |
| 2019/0159572 A1 | 5/2019 | Tarajano |

FOREIGN PATENT DOCUMENTS

| | | |
|---|---|---|
| CN | 207125462 U | 3/2018 |
| GB | 2363072 A | 12/2001 |
| KR | 1020170121099 A | 11/2017 |

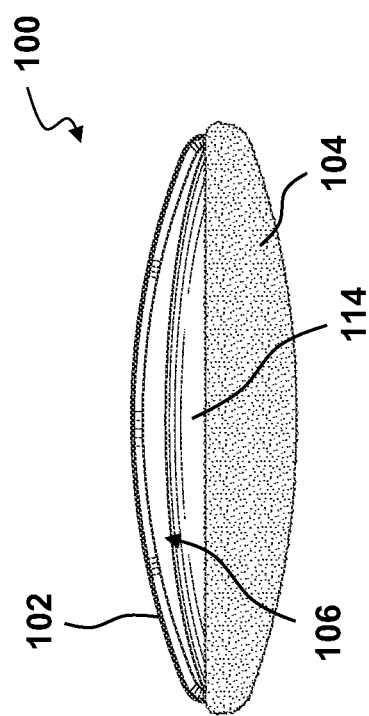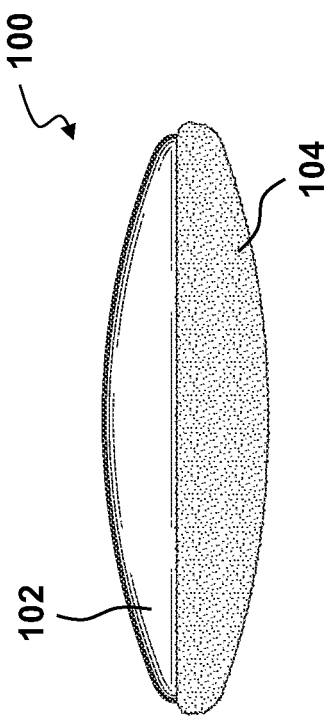

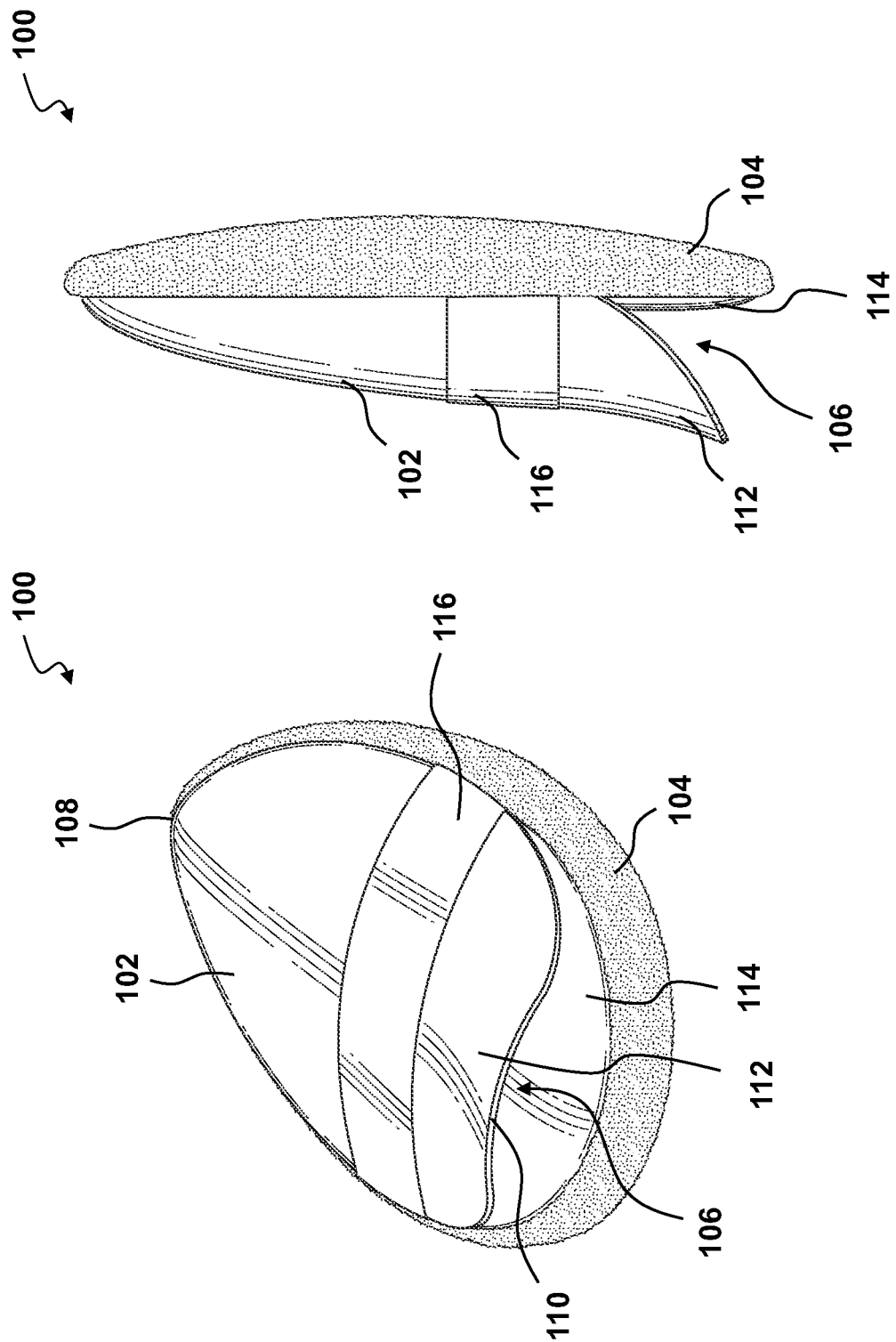

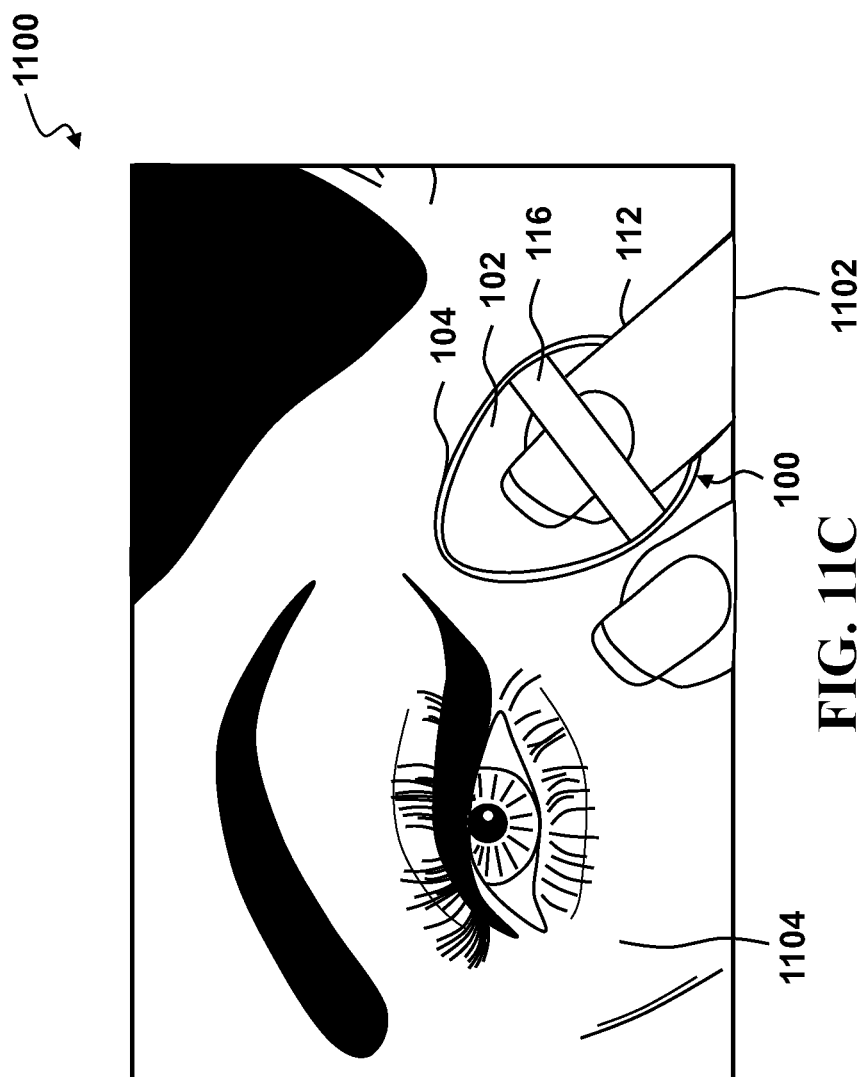

MAKEUP TOOL AND APPLICATOR

CROSS-REFERENCE TO RELATED APPLICATION

This application is a continuation of U.S. Non-Provisional patent application Ser. No. 16/536,295, filed Aug. 8, 2019, which claims the priority benefit of U.S. Provisional Patent Application Ser. No. 62/716,171, filed Aug. 8, 2018, all of which are incorporated herein by reference in their entirety.

TECHNICAL FIELD

Embodiments relate generally to makeup accessories, and more particularly to makeup applicators.

BACKGROUND

Existing makeup tools may be ineffective in certain areas due to their shape and size. Stabilizing the hand against the face to apply makeup with close control may result in smudging and/or removal of makeup from unwanted areas.

SUMMARY

One embodiment includes a makeup tool comprising: a first layer having a volume; a second layer having a volume larger than the volume of the first layer; a pocket formed between the first layer and the second layer configured to provide a precise contact point at a narrow tip end; where the makeup tool may be folium shaped; and where the makeup tool may be configured to apply makeup via the first layer, the second layer, and the contact point of a narrow tip end of the folium shaped makeup tool.

A system embodiment may include: a first layer; a second layer; a pocket formed between the first layer and the second layer to receive a fingertip of a user; and an elastic layer disposed over a portion of the first layer or the second layer to secure the fingertip of the user in the pocket.

In additional system embodiments, the first layer may comprise a cosmetic sponge. In additional system embodiments, the cosmetic sponge may comprise a polyurethane-based foam. In additional system embodiments, the second layer may comprise a woven or a knitted fabric to provide a plush surface. In additional system embodiments, the second layer may comprise velour. In additional system embodiments, the second layer may be rested against a portion of a face of the user without causing removal or smudging of any makeup applied to the portion of the face of the user.

Additional system embodiments may include: a gel insert disposed within the second layer. In additional system embodiments, a first end of the first layer may be joined to the second layer. In additional system embodiments, sides of the first layer proximate the first end may be joined to the second layer such that an opening of the pocket may be formed at a second end of the first layer. In additional system embodiments, the first layer may be joined to the second layer by at least one of: stitching and adhesive. In additional system embodiments, a second end of the first layer may be detached from the second layer to form a lip portion, where the second end of the first layer is distal from the first end of the first layer.

Additional system embodiments may include: a third layer attached to the second layer, where the first layer and the second layer may form an inner lining of the pocket. In additional system embodiments, the third layer may comprise a gripping surface, and the gripping surface may be configured to further secure the fingertip of the user in the pocket. In additional system embodiments, the elastic layer may be reversible between covering a portion of the first layer and covering a portion of the second layer. In additional system embodiments, the elastic layer may allow for full use of the first layer when the portion of the second layer is covered by the elastic layer, and the elastic layer may allow for full use of the second layer when the portion of the first layer is covered by the elastic layer.

A method embodiment may include: securing a first layer to a second layer, where a pocket may be formed between the first layer and the second layer to receive a fingertip of a user; and securing an elastic layer between the first layer and the second layer such that the elastic layer may be disposed over a portion of the first layer or the second layer to secure the fingertip of the user in the pocket.

Additional method embodiments may include: providing a gel insert within the second layer, where the gel insert may provide a cushioning effect when the second layer is pressed against the user. Additional method embodiments may include: securing a third layer to the second layer, where the first layer and the second layer may form an inner lining of the pocket, and where the third layer may comprise a gripping surface configured to further secure the fingertip of the user in the pocket. Additional method embodiments may include: reversing the elastic layer between covering a portion of the first layer and covering a portion of the second layer, where the elastic layer may allow for full use of the first layer when the portion of the second layer is covered by the elastic layer, and where the elastic layer may allow for full use of the second layer when the portion of the first layer is covered by the elastic layer.

Another system embodiment may include: a first layer comprising a cosmetic sponge, where the first layer may be configured to apply makeup to a portion of a face of a user; a second layer comprising a woven or a knitted fabric to provide a plush surface, where the second layer may be rested against the portion of the face of the user without causing removal or smudging of any makeup applied to the portion of the face of the user; a gel insert disposed within the second layer; a pocket formed between the first layer and the second layer to receive a fingertip of a user, where a first end of the first layer is joined to the second layer, and where sides of the first layer proximate the first end are joined to the second layer such that an opening of the pocket is formed at a second end of the first layer; a lip portion formed by a second end of the first layer detached from the second layer; a third layer attached to the second layer, where the first layer and the second layer may form an inner lining of the pocket, where the third layer may comprise a gripping surface, and where the gripping surface may be configured to further secure the fingertip of the user in the pocket; and an elastic layer disposed over a portion of the first layer or the second layer to secure the fingertip of the user in the pocket, where the elastic layer may be reversible between covering a portion of the first layer and covering a portion of the second layer, where the elastic layer may allow for full use of the first layer when the portion of the second layer is covered by the elastic layer, and where the elastic layer may allow for full use of the second layer when the portion of the first layer is covered by the elastic layer.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 6 depicts a rear view of the makeup tool and applicator of FIG. 1;

FIG. 7 depicts a front view of the makeup tool and applicator of FIG. 1;

FIG. 8 depicts a perspective view of the makeup tool and applicator of FIG. 1 showing the lip portion raised away from the third layer;

FIG. 9 depicts a right side view of the makeup tool and applicator of FIG. 1 showing the lip portion raised away from the third layer;

FIG. 11C depicts the user of FIG. 11A using a second side of the makeup tool and applicator of FIG. 1 with the elastic layer;

DETAILED DESCRIPTION

Figure 1:
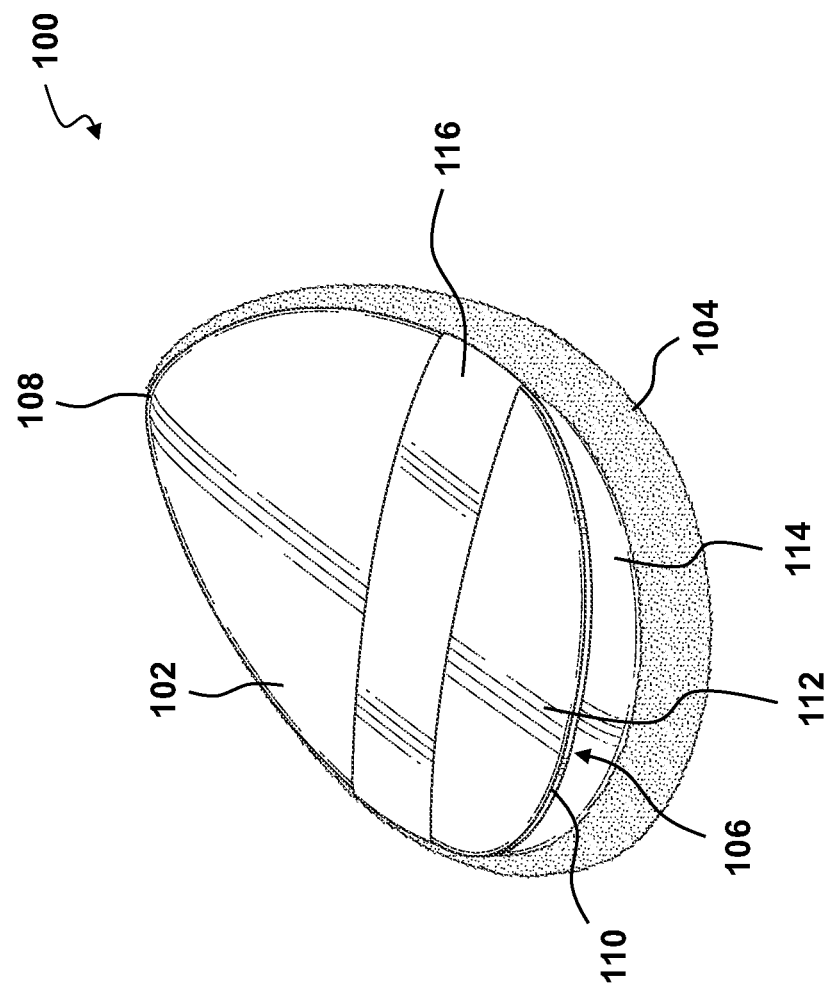
FIG. 1 depicts a perspective view of a makeup tool and applicator.

The disclosed system, method, and device include a makeup tool and applicator that may be held in place on one or more fingers or placed on a fingertip of a user for fine control while applying makeup. The makeup tool and applicator may include a first layer and a second layer disposed on an opposite side from the first layer. In some embodiments, the second layer may have a volume formed by an inner surface and an outer surface where the second layer may be cushioned, padded, and/or soft material thereby yielding readily to pressure or weight. In one embodiment, the outer surface may be made from a plush woven fabric resembling velvet for receiving or depositing makeup, for example, powder, and applying, setting, and/or baking the makeup to the skin. The second layer may be softened by the addition of cushions or padding between the inner surface and the outer surface where the inner surface may be made of a soft, smooth, and/or silky material. In one example, the inner surface provides a comfortable and luxurious feel to the touch of the finger. In one embodiment the first layer may be made of material resembling cosmetic sponge. The second layer may be configured to provide a precise point of contact with the skin for further makeup application such as touch-up, re-blend, and/or remove makeup. It is contemplated that any combination of materials disclosed herein may be used for the first layer and/or the second layer.

In some embodiments, the second layer may also be used as a hand guard, preventing makeup from smudging such as for steadying the hand during the application of eyeliner, without causing smudging or removal of existing makeup. Accordingly, instead of laying fingers on the face during application of makeup, the makeup tool and applicator may be used as a resting mechanism to apply makeup thereby preventing disruption to the makeup product already on the skin. In one example, the user may rest their hands on the first layer of the makeup tool and applicator during application. In this example, the user may use the second layer of the makeup tool and applicator to rest on the skin and act as a barrier between fingers and the skin to prevent makeup from smudging. In other examples, the first layer and the second layer may be switched where the first layer may be resting on the skin having already had makeup applied and the second layer may be in contact with the fingers and/or hand of the user.

The makeup tool and applicator may be secured to the one or more fingers via an elastic layer. The makeup tool and applicator may include a gel insert for cushioning the fingertip and providing comfort for the user where the gel insert may be silicon material sewn inside the volume formed by the inner surface and the outer surface of the second layer. The gel insert may also be configured to add weight to the makeup tool and applicator by providing mass and/or heaviness which allows a user to access or make contact with hard to reach areas. That is, via gravity and force applied by the user, for example, pressing motion, the makeup tool and applicator may apply powder on the different areas and contours of the face. In this example, the user may use their finger (or fingers) inside the pocket to precisely guide the pointed end of the makeup tool and applicator to reach any narrow areas on the face.

In some embodiments, the makeup tool and applicator may be folium shaped, where the tool may be in the shape of a teardrop which may look like an oval with one end pointed outward. Accordingly, the tool may be shaped to fit all contours of the face, and not leave unused corners in those areas of the face that are hard to reach and the teardrop shape offers precision to, for example, chisel cheekbones, bake concealer, set makeup, etc. The disclosed embodiments include a double-sided makeup tool and applicator where the makeup tool and applicator may both apply and touch-up makeup, for example, powder formulas. That is, one layer positioned on one side may be configured to pick up makeup products and deposit the products on the skin acting or operating as an applicator where the other layer position on the opposite side may be configured to re-blend or touch up previously applied makeup so the makeup provides a smooth finish and seamless look.

The teardrop shape may form a pocket having an opening on the oval side—positioned opposite the narrow tip end pointed outward—where the pocket may be configured to allow a finger of the user to slide inside and provide precise applicability of makeup to small areas around the face. The makeup tool and applicator include embodiments where the shape provides support to target contours of the face with the narrow tip and for further precision support insertion of fingers into the pocket via a precise contact point at a narrow tip end. Additionally, the pocket for the finger allows for precision and ease so product can be distributed smoothly and evenly across the complexion.

As further described by the figured below, the present embodiments disclose a makeup tool and applicator where a soft plush side (second layer) comprising fiber material, for example, microfibers, fibrils, etc. is configured to grab and deposit a desired amount of powder. The buffed suede side (first layer) is configured to gently re-blend makeup to make the previously applied makeup look smooth and seamless. That is, one side or layer is configured to deposit powder to set and bake makeup whereas the other side or layer is configured to re-blend and touch-up the makeup. The shape and materials of the tool allow a user to target contours of the face with the narrow tip and/or insert fingers into the pocket for further precision. A finger band (elastic layer) may be used to hold fingers in place and provide grip on the tool for application ease in addition to a user being able to slide fingers into the pocket for more precision. The elastic layer used as a finger band may be in one position be covering one side of the tool and configured to be reversed to cover the other side of the tool, thereby allowing the user to apply either of the two provided sides/layers by flipping the elastic layer from one side to the other. Additionally, the tool may provide a way for the user to rest hands on the tool during application to prevent makeup from smudging.

Figure 3:
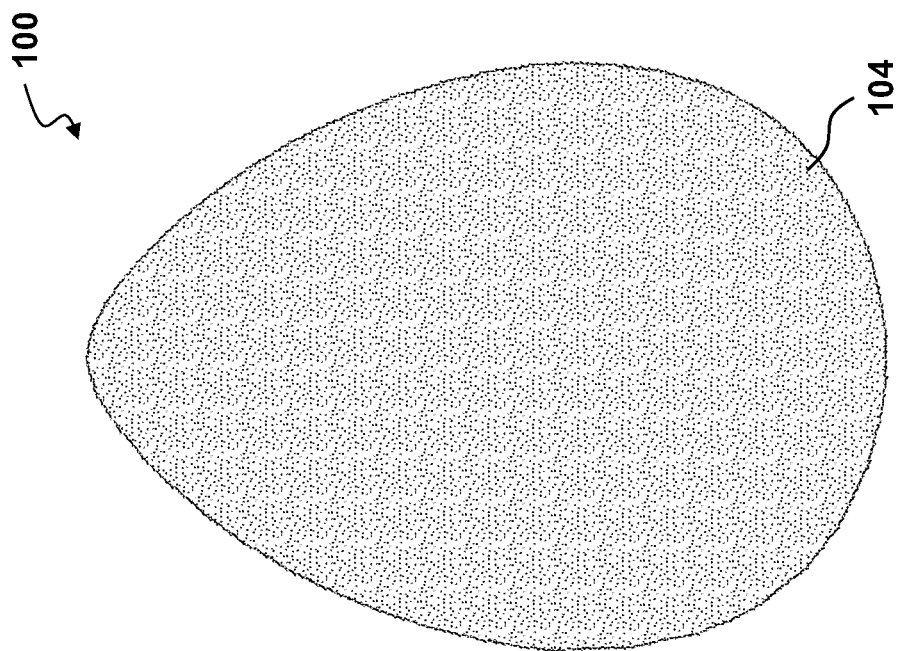
FIG. 3 depicts a bottom view of the makeup tool and applicator of FIG. 1.
Figure 2:
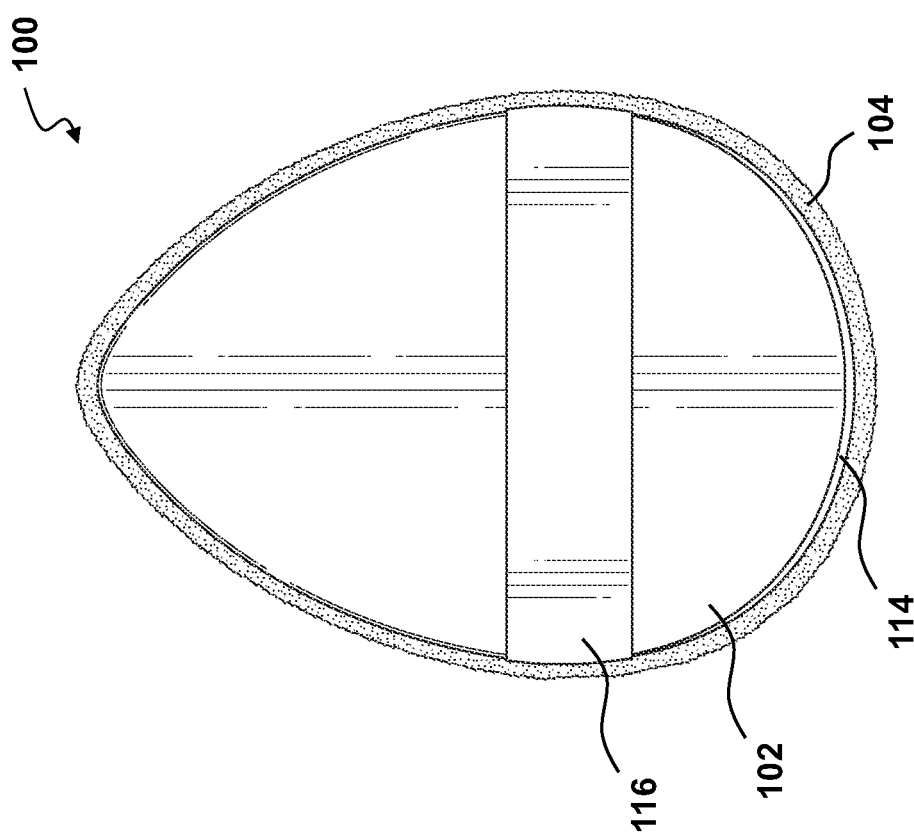
FIG. 2 depicts a top view of the makeup tool and applicator of FIG. 1.
Figure 4:
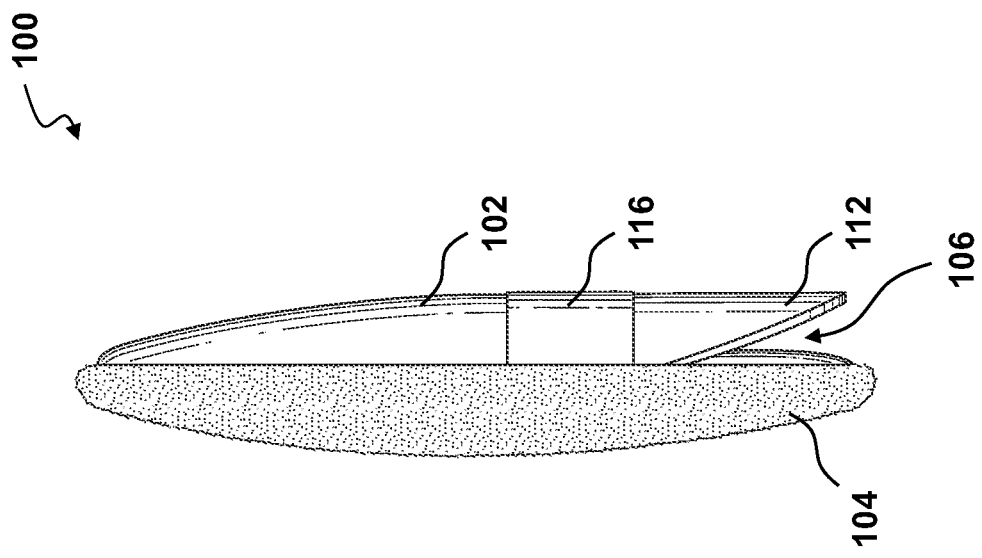
FIG. 4 depicts a right side view of the makeup tool and applicator of FIG. 1.
Figure 5:
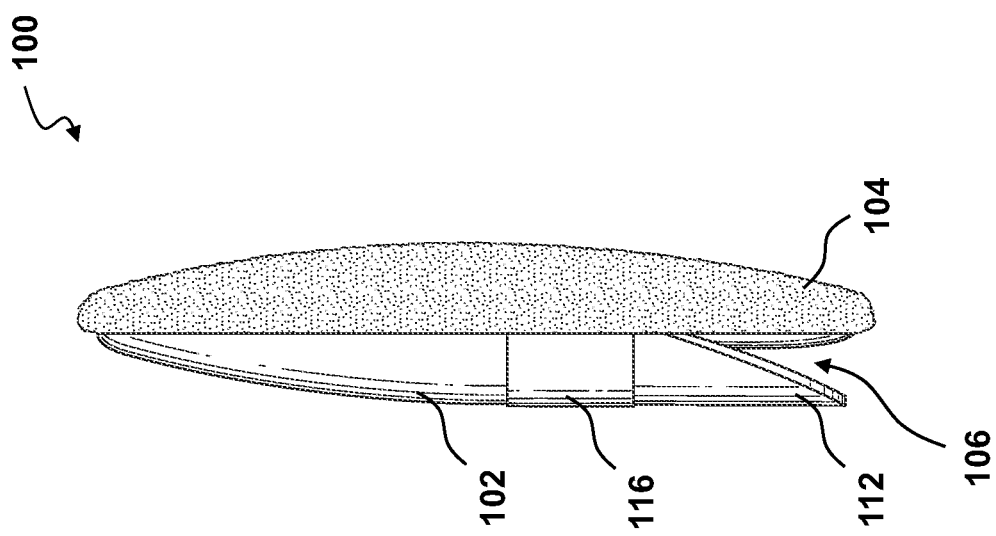
FIG. 5 depicts a left side view of the makeup tool and applicator of FIG. 1.

FIG. 1 depicts a perspective view of a makeup tool and applicator 100. FIG. 2 depicts a top view of the makeup tool and applicator 100 of FIG. 1. FIG. 3 depicts a bottom view of the makeup tool and applicator 100 of FIG. 1. FIG. 4 depicts a right side view of the makeup tool and applicator 100 of FIG. 1. FIG. 5 depicts a left side view of the makeup tool and applicator 100 of FIG. 1. FIG. 6 depicts a rear view of the makeup tool and applicator 100 of FIG. 1. FIG. 7 depicts a front view of the makeup tool and applicator 100 of FIG. 1.

Figure 11A:
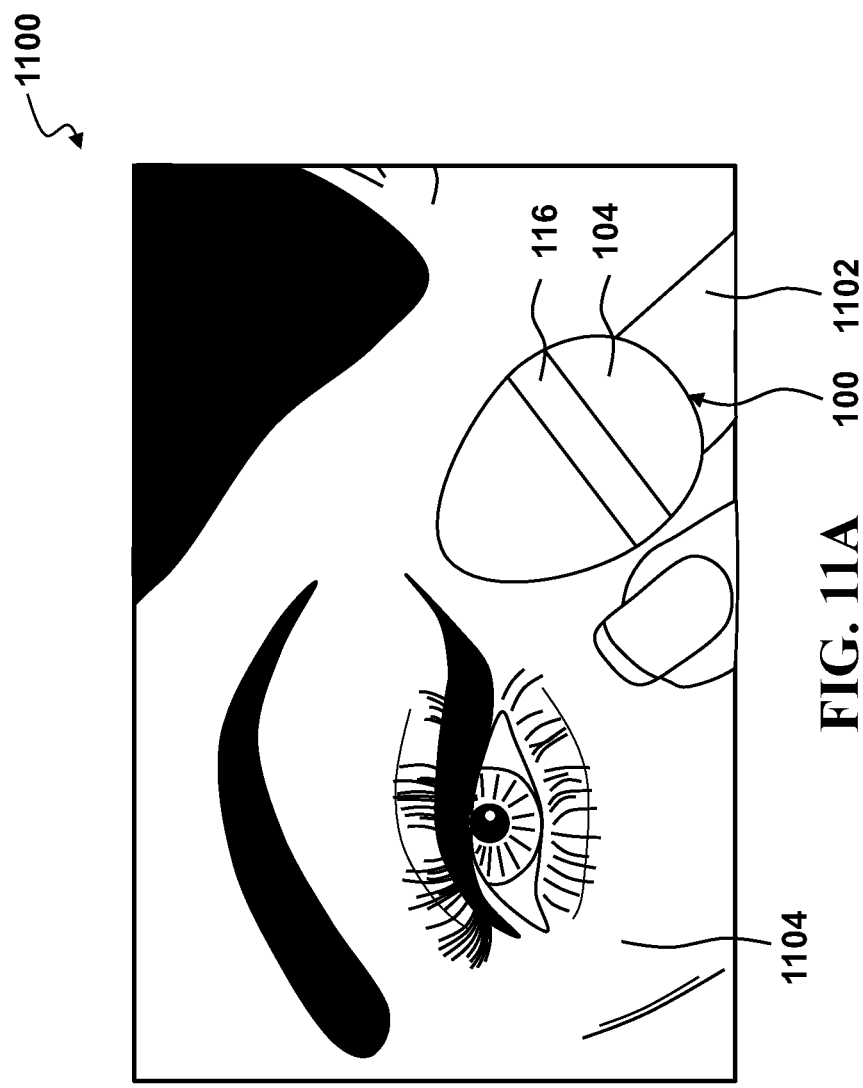
FIG. 11A depicts a user using a first side of the makeup tool and applicator of FIG. 1.
Figure 11B:
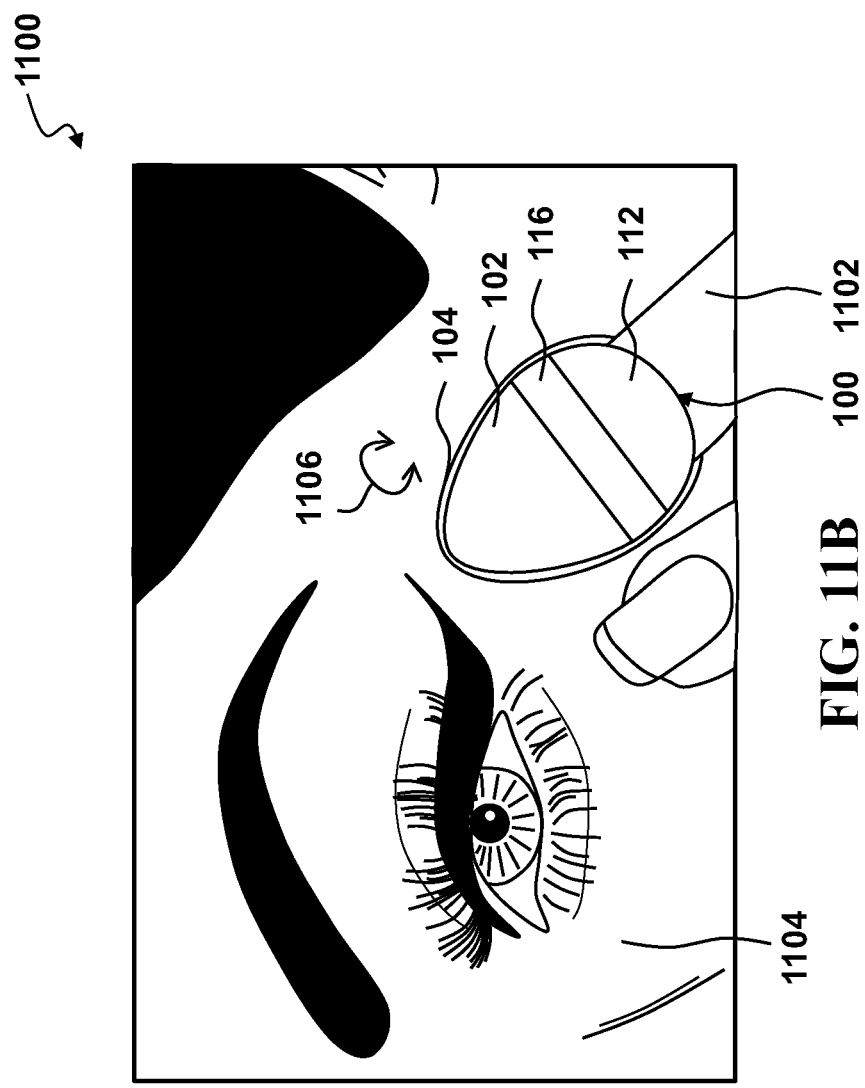
FIG. 11B depicts the user of FIG. 11A using a second side of the makeup tool and applicator of FIG. 1 with the pocket.

With further reference to FIG. 1, the makeup tool and applicator 100 may have a first layer 102 and a second layer 104 joined together to form a pocket 106 in between and configured to receive a finger of a user (See FIGS. 11A-11B). The first layer 102 may be made from a cosmetic sponge material, such as polyurethane-based. In some embodiments, the cosmetic sponge material may be made from the polyurethane-based foam, that may include anti-UV inhibitors, and/or may be made from heat-sealable foam. In other embodiments, any other material may be used as part of the first layer 102 to reapply, remove, and/or blend makeup. A first end 108 of the first layer 102 may be joined to the second layer 104, such as by stitching, adhesive, or the like. Sides of the first layer 102 proximate the first end may be joined to the second layer 104 such that an opening of the pocket 106 is formed at a second end 110 of the first layer. The second end 110 of the first layer 102 may be detached from the second layer 104 to form a lip portion 112. The second end 110 of the first layer 102 may be distal from the first end 108 of the first layer 102. The first layer 102 may be used to apply makeup, such as a foundation, concealer, powder, blush, highlighter, or the like.

Embodiments include examples where the second layer 104 is made from plush, knitted fabric or textile similar to velvet or velveteen. It is usually made from cotton, but can also be made from synthetic materials such as polyester. In one embodiment, the second layer 104 may be made from velour. In some embodiments, the second layer 104 may be made from cotton, polyester, or the like. In some embodiments, the second layer 104 may be made from a woven or a knitted fabric, allowing it to stretch. In other embodiments, any other material may be used as part of the second layer 104 to apply and/or blend makeup. The second layer 104 may provide a plush surface. The second layer 104 may be rested against a portion of the face of the user without causing removal or smudging of any makeup applied to the skin. In some embodiments, the second layer may also be used to apply makeup. A gel insert (not shown, See FIG. 10) may be disposed within the second layer 104 to provide a cushioning effect when the second layer 104 is pressed against the skin of the user, such as the face.

A third layer 114 may be attached to the second layer 104 and create an inner surface. The third layer 114 and the first layer 102 may form an inner lining or surface of the pocket 106 for receiving the finger of the user (See FIGS. 11A-11B). The third layer 114 may be made from polyurethane and may provide a gripping surface for a user when a finger is inserted into the pocket 106.

An interchangeable and reversible fourth layer 116 or elastic layer may be disposed over a portion of the first layer 102 or second layer 104. The fourth layer 116 may be an elastic ribbon disposed across a portion of the first layer 102 or second layer 104. The fourth layer 116 may be attached to the first layer 102 and/or the second layer 104. The fourth layer 116 may ensure that a finger placed in the pocket 106 is secured outside or within the pocket so that the makeup tool and applicator 100 does not fall off the finger. The fourth layer 116 may be used on its own without a finger in the pocket 106. The fourth layer 116 may be of stretchy material to be reversible and interchangeable. The fourth layer 116 allows the user to use either side of the makeup tool and applicator 100 with ease and switch back and forth. The fourth layer 116 may be used on its own or in combination with the pocket 106. The fourth layer 116 may be flipped from one side to another, e.g., from covering the first layer 102 to covering the second layer 104 to allow for full use of either layer (102, 104). The fourth layer 116 and/or the pocket 106 may be used to hang the makeup tool and applicator 100 for storage or to dry after cleaning. The fourth layer 116 may be repositioned based on the desired side to be cleaned and/or dried.

FIG. 8 depicts a perspective view of the makeup tool and applicator of FIG. 1 showing the lip portion 112 raised away from the third layer 114. FIG. 9 depicts a right side view of the makeup tool and applicator of FIG. 1 showing the lip portion 112 raised away from the third layer 114. The lip portion 112 is a part of the first layer 102 and may be made from a cosmetic sponge material. The lip portion 112 may bend, stretch, and/or expand to accommodate a user's finger in the pocket 106.

Figure 10:
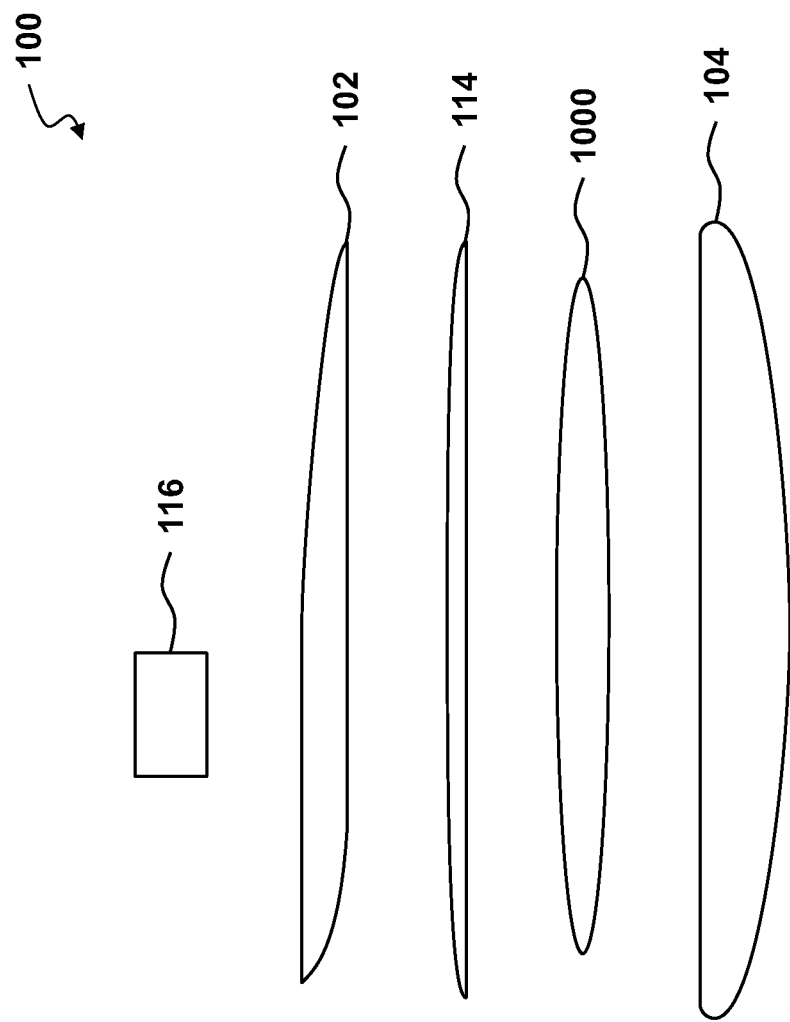
FIG. 10 depicts an exploded side view of the makeup tool and applicator of FIG. 1.

FIG. 10 depicts an exploded side view of the makeup tool and applicator 100 of FIG. 1. The fourth layer 116 may be made from an elastic material and attached over a portion of the first layer 102. In some embodiments, the fourth layer 116 may be disposed over a portion of the second layer 104 and/or around the entire makeup tool and applicator 100. In other embodiments, the fourth layer 116 may be integrated into the first layer 102. In other embodiments, the fourth layer 116 may be disposed between the first layer 102 and the second layer 104 and/or third layer 114 so as to provide additional surface area of the first layer 102 to be used for applying and/or blending makeup. The first layer 102 may be made from a cosmetic sponge material. The third layer 114 may be attached to the second layer 104. The second layer 104 may be made from velour. A gel insert 1000 may be disposed within the second layer 104. In some embodiments, the gel insert 1000 may be disposed between the second layer 104 and the third layer 114. The gel insert 1000 may provide cushioning to the fingertip of the user. The gel insert 1000 may also provide volume and ensure that the elastic fourth layer 116 contains a finger when inserted into the makeup tool and applicator 100. While a gel insert 1000 is described, any other cushioning material or fill may be used.

FIG. 11A depicts a user using 1100 a second layer 104 of the makeup tool and applicator 100 of FIG. 1. The user may place their finger 1102 inside the pocket or between the elastic layer 116 and the first layer 102 or between the elastic layer 116 and the second layer 104 of the makeup tool and applicator 100 for close control (See FIG. 11C). The user may, for example, apply an eye cream, concealer, foundation, powder, blush, highlighter, or the like to an area around the eye 1104 or to a portion of the outer surface of the second layer of the makeup tool and applicator 100. The user may then bounce the second layer of the makeup tool and applicator 100 across the eye area 1104 (in this example), or any other surface area of the skin. While the eye area 1104 is depicted, the cosmetic tool 100 may be used across any portion of the user's face, body, and skin. The elastic layer 116 may be reversed to the side not being used against the skin to provide maximum surface area for the side being used and full grip of the makeup tool and applicator.

FIG. 11B depicts the user of FIG. 11A using a first layer of the makeup tool and applicator 100 of FIG. 1 with the pocket. The user may rotate 1006 the makeup tool and applicator 110 so that the second layer 104 is facing away from the skin and the first layer 102 is contacting the skin. One embodiment depicts the finger of the user as being within the pocket of the makeup tool and applicator where the mechanism provides a more precise control and reach for any areas having narrow channels and/or tapered shapes, via pressing and exerting force at the pointed end of the makeup tool and applicator.

FIG. 11C depicts the user of FIGS. 11A-11B using a first layer of the makeup tool and applicator 100 of FIG. 1 with the elastic layer 116. The user may use the pocket or elastic layer 116 to secure their fingertip to the makeup tool and applicator 100. The elastic layer 116 may be flipped to the non-used side so that the side being used against the skin has a maximum surface area. For example, if the user is using the first layer 102 against the skin, then the elastic may be flipped to cover a portion of the second layer 104. The user may then secure the makeup tool and applicator 100 to their fingertip 1102 using the elastic layer 116 such that their finger 1102 is disposed between the elastic layer 116 and the first layer 102 (as shown) or the pocket. The elastic layer 116 maintains the makeup tool and applicator 100 on the finger 1102 of the user regardless of the orientation of the makeup tool and applicator 100. Additionally, the second layer 104 may be used to rest against the face without causing removal or smudging of makeup already on the face, such as to provide a resting point and stability when applying other makeup.

Figure 12A:
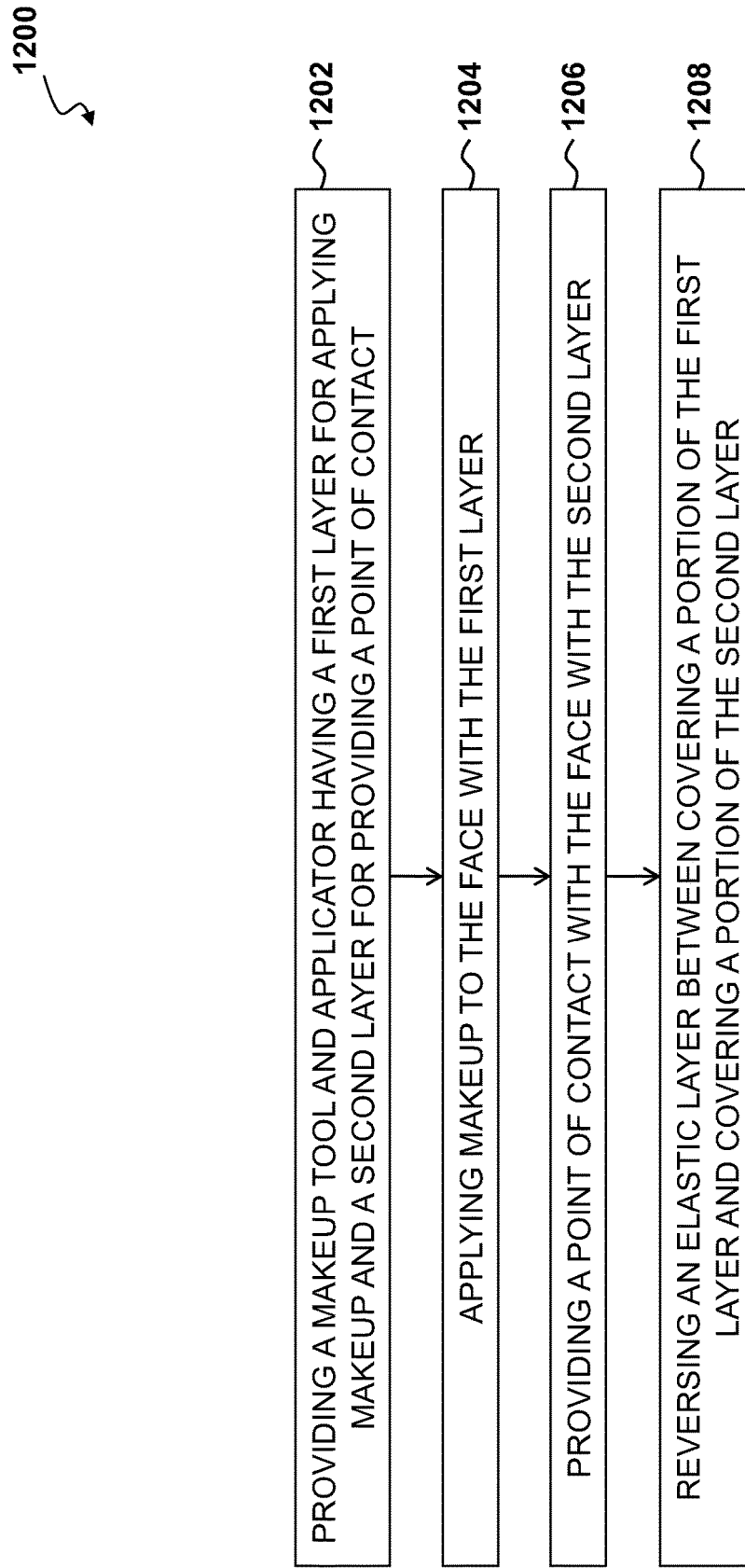
FIG. 12A depicts a block diagram of a method for using the makeup tool and applicator of FIG. 1.

FIG. 12A depicts a block diagram of a method 1200 for using the makeup tool and applicator of FIG. 1. A makeup tool and applicator is provided having a layer for applying makeup and another layer for re-applying or providing a resting point while in contact (step 1202). One layer of the makeup tool and applicator may be used to apply makeup to the skin, for example, to an eye area of a user and the makeup tool and applicator may be rotated on the finger of the user to the other layer and the other layer used to re-apply makeup (step 1204). The makeup tool and applicator may provide a point of contact with the face without smudging or removing makeup on the face (step 1206). One or more eye creams, concealers, foundations, powders, blushes, highlighters, and the like may be used with the makeup tool and applicator. While the face and eye area are used as examples, the makeup tool and applicator may be used on any portion of the user's skin. The method 1200 may include reversing an elastic layer between covering a portion of the one layer and covering a portion of the other layer (step 1208). The elastic layer may allow for full use of the one layer when the portion of the other layer is covered by the elastic layer. The elastic layer may allow for full use of the other layer when the portion of the one layer is covered by the elastic layer.

Figure 12B:
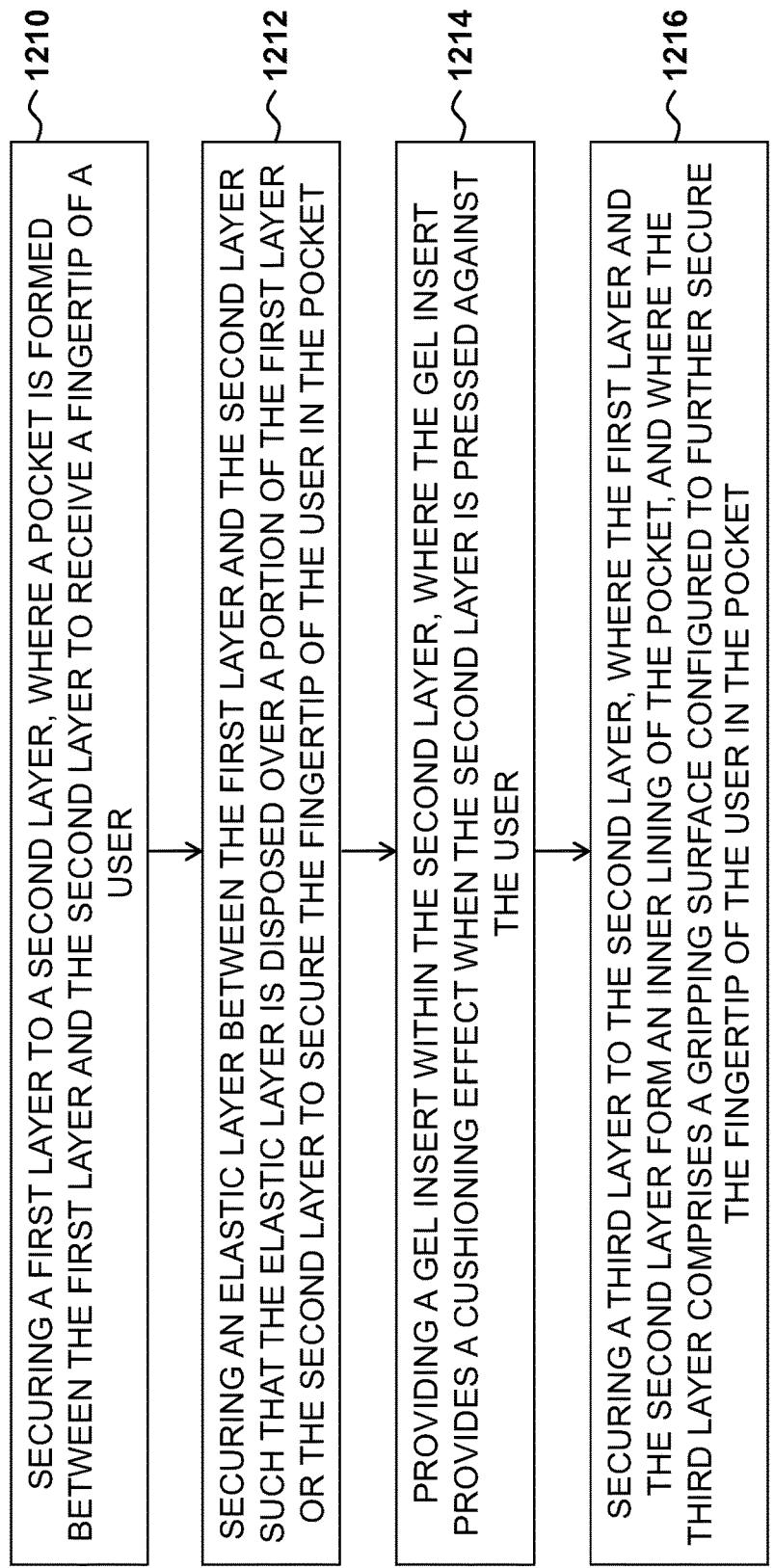
FIG. 12B depicts a block diagram of a method for assembling the makeup tool and applicator of FIG. 1.

FIG. 12B depicts a block diagram of a method 1201 for assembling the makeup tool and applicator of FIG. 1. The method 1201 may include securing a first layer to a second layer, wherein a pocket may be formed between the first layer and the second layer to receive a fingertip of a user (step 1210). The method 1201 may also include securing an elastic layer between the first layer and the second layer such that the elastic layer is disposed over a portion of the first layer or a portion of the second layer to secure the fingertip of the user in the pocket (step 1212). Additionally, in one embodiment, the elastic layer may be used to secure one or more fingers of the user to either the first layer or the second layer. The method 1201 may also include providing a gel insert within the second layer, where the gel insert may provide a cushioning effect when the second layer is pressed against the user (step 1214). The method 1201 may also include securing a third layer to the second layer, where the first layer and the second layer may form an inner lining of the pocket, and where the third layer may comprises a gripping surface configured to further secure the fingertip of the user in the pocket (step 1216).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A makeup tool comprising:
   a first layer having a volume, wherein the first layer comprises a cosmetic sponge;
   a second layer having a volume larger than the volume of the first layer, wherein at least a portion of the first layer is joined to at least a portion of the second layer; and
   an elastic layer disposed over a portion of the first layer or a portion of the second layer to secure a fingertip of a user;
   wherein the makeup tool is configured to apply makeup via the first layer, the second layer, and a contact point of a narrow tip end of the makeup tool.

2. The makeup tool of claim 1, wherein the cosmetic sponge comprises polyurethane-based foam.

3. The makeup tool of claim 1, wherein the second layer comprises a woven fabric to provide a plush surface.

4. The makeup tool of claim 1, wherein the second layer comprises a knitted fabric to provide a plush surface.

5. The makeup tool of claim 1, wherein the makeup tool comprises a silicon material.

6. The makeup tool of claim 1, further comprising:
   a gel insert disposed within the volume of the second layer.

7. The makeup tool of claim 6, wherein the gel insert comprises a silicon material.

8. The makeup tool of claim 1, wherein the makeup tool is folium shaped.

9. The makeup tool of claim 1, further comprising:
   a pocket formed between the first layer and the second layer configured to provide the precise contact point at the narrow tip end.

10. The makeup tool of claim 9, further comprising:
a third layer attached to the second layer, wherein the first layer and the second layer form an inner lining of the pocket.

11. The makeup tool of claim 10, wherein the third layer comprises a gripping surface, wherein the gripping surface is configured to further secure the fingertip of a user in the pocket.

12. The makeup tool of claim 10, wherein the third layer comprises a smooth silky surface.

13. The makeup tool of claim 9, wherein a first end of the first layer is joined to the second layer.

14. The makeup tool of claim 13, wherein sides of the first layer proximate the first end are joined to the second layer such that an opening of the pocket is formed at a second end of the first layer.

15. The makeup tool of claim 14, wherein the first layer is joined to the second layer by at least one of: stitching and adhesive.

16. The makeup tool of claim 13, wherein a second end of the first layer is detached from the second layer to form a lip portion, wherein the second end of the first layer is distal from the first end of the first layer.

17. The makeup tool of claim 1, wherein the second layer is configured to rest against a portion of skin of a user without causing removal or smudging of any makeup applied to the portion of the skin of the user.

18. The makeup tool of claim 1, wherein the elastic layer is reversible between covering a portion of the first layer and covering a portion of the second layer.

19. The makeup tool of claim 18, wherein the elastic layer allows for full use of the first layer when the portion of the second layer is covered by the elastic layer, and wherein the elastic layer allows for full use of the second layer when the portion of the first layer is covered by the elastic layer.

* * * * *